(12) United States Patent
Sohn et al.

(10) Patent No.: US 8,081,157 B2
(45) Date of Patent: Dec. 20, 2011

(54) APPARATUS AND METHOD OF SCROLLING SCREEN IN PORTABLE DEVICE AND RECORDING MEDIUM STORING PROGRAM FOR PERFORMING THE METHOD

(75) Inventors: Young-chul Sohn, Seoul (KR); Tae-young Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1213 days.

(21) Appl. No.: 11/540,646

(22) Filed: Oct. 2, 2006

(65) Prior Publication Data
US 2007/0171191 A1 Jul. 26, 2007

(30) Foreign Application Priority Data
Jan. 25, 2006 (KR) .................. 10-2006-0007884

(51) Int. Cl.
*G09G 5/00* (2006.01)
(52) U.S. Cl. ....................... 345/156; 345/158
(58) Field of Classification Search .......... 345/156–158, 345/163, 168, 169; 715/856, 857
See application file for complete search history.

(56) References Cited

U.S. PATENT DOCUMENTS

| | | | |
|---|---|---|---|
| 6,909,906 B1 * | 6/2005 | Miyashita | 345/163 |
| 7,084,855 B2 * | 8/2006 | Kaku et al. | 345/158 |
| 7,142,191 B2 * | 11/2006 | Idesawa et al. | 345/156 |
| 2002/0167488 A1 * | 11/2002 | Hinckley et al. | 345/156 |
| 2003/0095155 A1 | 5/2003 | Johnson | |
| 2006/0146167 A1 * | 7/2006 | Aizawa et al. | |

FOREIGN PATENT DOCUMENTS

| | | |
|---|---|---|
| CN | 1300415 A | 6/2001 |
| CN | 1581058 A | 2/2005 |
| EP | 1 583 333 A2 | 10/2005 |
| GB | 2 378 878 A | 2/2003 |
| JP | 2004-246920 A | 9/2004 |
| KR | 10-2005-0096692 A | 10/2005 |
| WO | 00/75914 A1 | 12/2000 |
| WO | 2005/103863 A2 | 11/2005 |

* cited by examiner

*Primary Examiner* — Regina Liang
(74) *Attorney, Agent, or Firm* — Sughrue Mion, PLLC

(57) ABSTRACT

A screen scroll apparatus of a portable device includes: a sensor unit which senses and outputs 2-dimensional coordinate values of at least one position related to the portable device; a display unit; a memory storing contents with a resolution higher than that of the screen that can be displayed; and a control unit which scrolls the screen based on the 2-dimensional coordinate values if the 2-dimensional coordinate values change when contents are read from the memory and provided to the display unit. A screen scroll method includes: if a resolution of contents displayed on the portable device is higher than a resolution of a screen that can be displayed, monitoring 2-dimensional coordinate values of at least one position related to the portable device output from the sensor unit; and if the 2-dimensional coordinate values change, scrolling a screen displayed on the portable device based on the 2-dimensional coordinate values.

19 Claims, 9 Drawing Sheets

APPARATUS AND METHOD OF SCROLLING SCREEN IN PORTABLE DEVICE AND RECORDING MEDIUM STORING PROGRAM FOR PERFORMING THE METHOD

CROSS-REFERENCE TO RELATED APPLICATIONS

This application claims priority from Korean Patent Application No. 10-2006-0007884, filed on Jan. 25, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to screen scrolling technology of a portable device, and more particularly, to screen scrolling of a portable device capable of viewing contents of a resolution higher than that of a screen of the portable device, and a recording medium storing a program for executing the method.

2. Description of the Related Art

Portable devices are also referred to as portable information appliances.

The portable devices include personal digital assistants (PDAs), portable PCs, cellular phones, digital watches, and laptops.

When contents having a resolution higher than that of a screen of these portable devices are viewed, a direction key or gravity sensor mounted on the portable devices is used to scroll the screen. The contents may include web pages, documents or images.

However, when the direction key is used, if the position of a screen that a user wants to view is located far from the position of a current screen, the user has to control the direction key many times and it is difficult to scroll the screen quickly. Also, when the gravity sensor is used, the screen should be scrolled in a 3-dimensional space with using two hands holding the portable device, the screen scrolling in a 2-dimensional space is not supported.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a screen scrolling apparatus and method of a portable device capable of quickly and easily scrolling a screen in a 2-dimensional space and a recording medium storing a program for executing the method.

The present invention also provides a screen scrolling apparatus and method of a portable device capable of scrolling a screen using a zoom-in and/or zoom-out functions, and a recording medium storing a program for executing the method.

According to an aspect of the present invention, there is provided a screen scroll apparatus of a portable device including: a sensor unit sensing and outputting 2-dimensional coordinate values of at least one point related to the portable device; a display unit displaying a screen; a memory storing contents with a resolution higher than that of a screen that can be displayed on the display unit; and a control unit scrolling a screen displayed on the display unit based on the 2-dimensional coordinate values if 2-dimensional coordinate values change when contents are read from the memory and provided to the display unit.

The sensor unit may further comprise a distance sensor measuring the distance between the sensor unit and the ground and the providing the measured distance value to the control unit, and the control unit controls the operations of the memory and the display unit based on the distance value output from the distance sensor so that a screen displayed on the display unit is zoomed in or out.

According to another aspect of the present invention, there is provided a screen scroll method of a portable device with a detachable sensor unit, the method including: if the resolution of contents displayed on the portable device is higher than the resolution of a screen that can be displayed on the portable device, monitoring 2-dimensional coordinate values of at least one point related to the portable device output from the sensor unit; and if the 2-dimensional coordinate values change, scrolling a screen displayed on the portable device based on the 2-dimensional coordinate values.

According to another aspect of the present invention, there is provided a computer-readable recording medium having embodied thereon a computer program for executing a screen scroll method of a portable device with a detachable sensor unit, wherein the computer-readable recording medium includes codes of: obtaining 2-dimensional coordinate values of at least one point related to the portable device from the sensor unit; and if the 2dimensional coordinate values change, scrolling a screen displayed on the portable device based on the 2-dimensional coordinate values.

BRIEF DESCRIPTION OF THE DRAWINGS

The above aspects of the present invention will be more apparent by describing exemplary embodiments of the present invention with reference to the attached drawings, in which.

DETAILED DESCRIPTION OF EXEMPLARY EMBODIMENTS

The present invention will now be described more fully with reference to the accompanying drawings, in which exemplary embodiments of the invention are shown.

Figure 1:
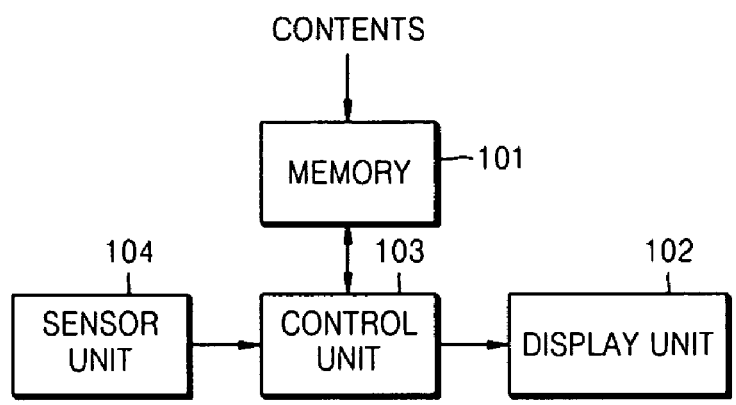
FIG. 1 is a functional block diagram of a screen scrolling apparatus of a portable device according to an exemplary embodiment of the present invention.

FIG. 1 is a functional block diagram of a screen scrolling apparatus of a portable device according to an exemplary embodiment of the present invention. Referring to FIG. 1, the screen scrolling apparatus of a portable device includes a memory 101, a display unit 102, a control unit 103, and a sensor unit 104.

Contents to be displayed on the display unit 102 are stored in the memory 101. The contents may include, for example, web pages, documents, and/or images. The contents stored in the memory may be downloaded wirelessly through a network such as the Internet or can be received in a communication method using, for example, a universal serial bus (USB) port in a wired fashion. Accordingly, the resolution of the contents stored in the memory 101 may be higher than that of a screen that can be displayed on the display unit 102.

The display unit 102 displays a screen according to control of the control unit 103. A screen displayed is based on the contents read from the memory 101.

If the resolution of the contents read from the memory 101 is higher than that of the screen that can be displayed on the display unit 102, the display unit 102 displays a screen containing part of the contents read from the memory 101, according to control of the control unit 103. At this time, the control unit temporarily holds the contents read from the memory 101.

If the resolution of the contents read from the memory 101 is higher than that of the screen that can be displayed on the display unit 102, the control unit 103 monitors the output of the sensor unit 104.

The sensor unit 104 senses 2-dimensional coordinate values of at least one position related to a portable device, and outputs the values. The 2-dimensional coordinate values are also referred to as x-y coordinate values.

Figure 2A:
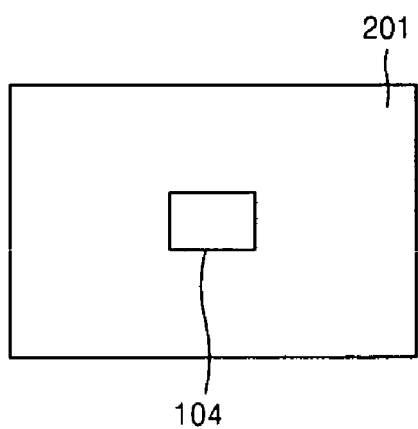
FIG. 2A illustrates an example of a sensor unit attached at the back of a portable device.
Figure 2B:
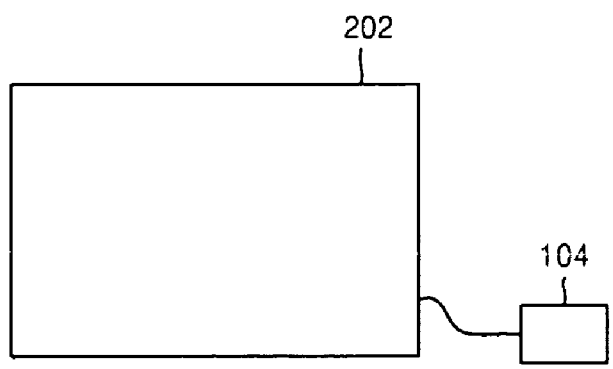
FIG. 2B illustrates an example of a sensor unit separated from a portable device according to an exemplary embodiment of the present invention.

The sensor unit 104 may be attached, for example, at the center of the back of a portable device 201 as shown in FIG. 2A, or can be separated from a portable device 202 as shown in FIG. 2B. When the sensor unit 104 is separated as shown in FIG. 2B, the portable device 202 and the sensor unit 104 can be configured to communicate data with each other through wire or wirelessly.

If the sensor unit 104 is attached at the center of the back of the portable device 201 as shown in FIG. 2A, the 2-dimensional coordinate values output from the sensor unit 104 may vary with respect to the movement of the portable device 201.

Meanwhile, if the sensor unit 104 is separated from the portable device, the 2-dimensional coordinate values output from the sensor unit 104 may vary with respect to the movement of the sensor unit 104.

If the sensor unit 104 includes one 2-dimensional coordinate sensor, the sensor unit 104 senses and outputs 2-dimensional coordinate values corresponding to the center of the portable device.

Figure 3A:
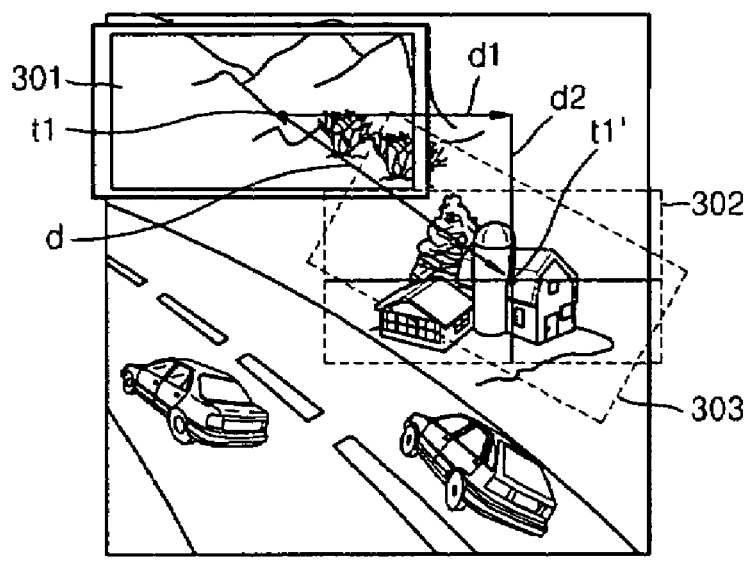
FIGS. 3A through 3C illustrate an example of the relation between 2-dimensional coordinate values output from a sensor unit composed of one 2-dimensional coordinate sensor, and the contents of a screen being displayed according to an exemplary embodiment of the present invention.
Figure 3B:
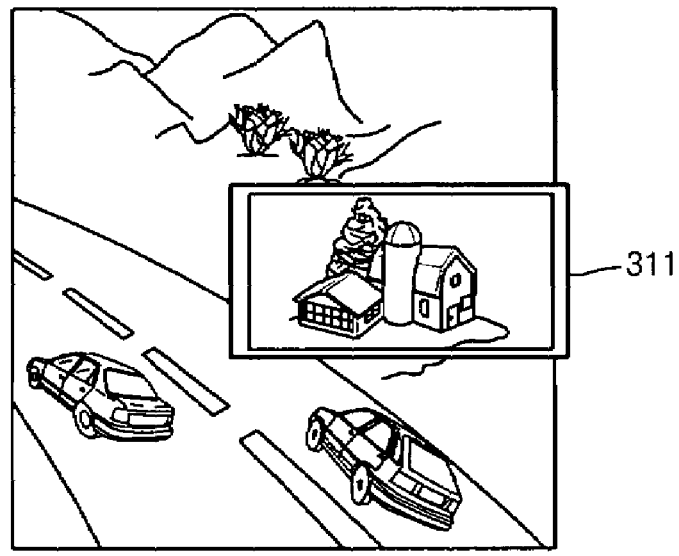
Figure 3C:
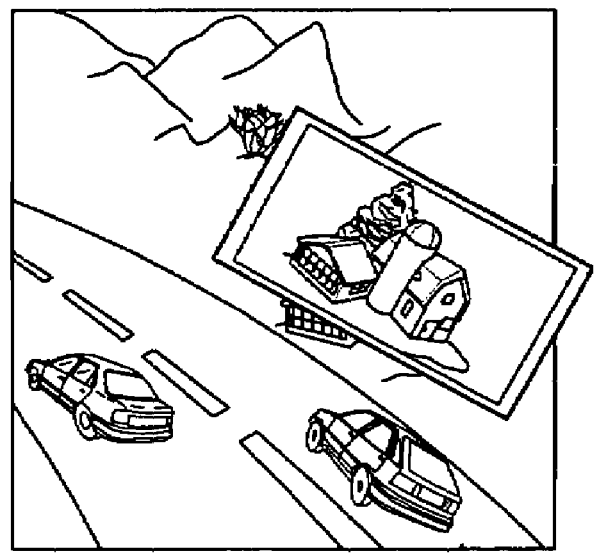

FIGS. 3A through 3C illustrate an example of the relation between 2-dimensional coordinate values output from the sensor unit 104 and the contents of a screen being displayed on the display unit 102 when the sensor unit 104 is composed of one 2-dimensional coordinate sensor, and attached at the back of the portable device as shown in FIG. 2A. Referring to FIG. 3A, if the portable device travels from position 301 to position 302, the 2-dimensional coordinate values output from the sensor unit 104 change from t1 to t1'.

If the 2-dimensional coordinate values output from the sensor unit 104 change, the control unit 103 scrolls the screen displayed on the display unit 102 based on the 2-dimensional coordinate values.

That is, if the 2-dimensional coordinate values change from t1 to t1' as shown in FIG. 3A, the control unit 103 scrolls the screen displayed on the display unit 102 so that the screen 311 as shown in FIG. 3B can be displayed on the display unit 102.

For this screen scrolling, the control unit 103 obtains the amount d1 of variation in the x-axis and the amount d2 of variation in the y-axis by using 2-dimensional coordinate values t1 and t1' as shown in FIG. 3A, and based on thus obtained amounts d1 and d2, obtains the movement distance (d) of the center of the portable device and the movement direction. The movement distance (d) can be obtained using a method for obtaining a length of a side of a right triangle. The movement direction is determined according to whether the variation amount is (+) or (−).

Figure 4:
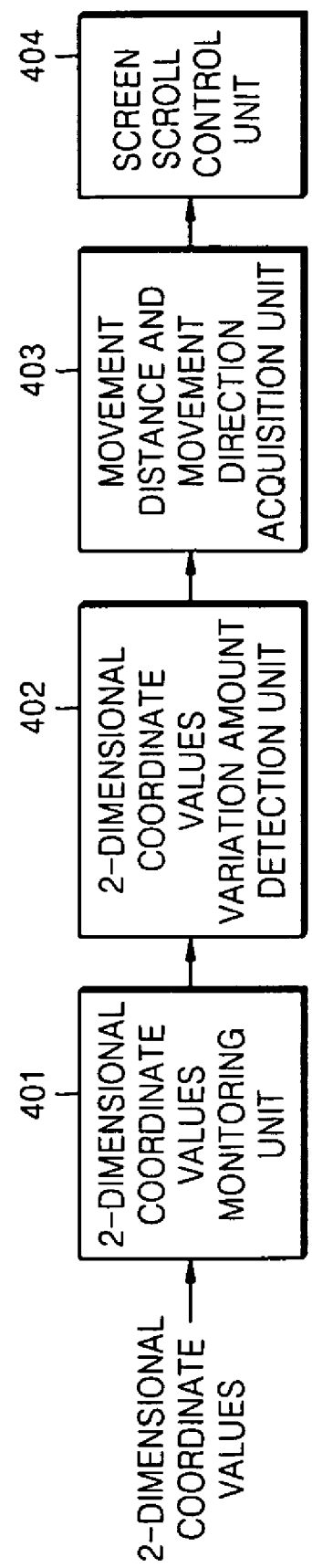
FIG. 4 is a detailed functional block diagram of a control unit shown in FIG. 1.

For this, the control unit 103 may include a 2-dimensional coordinate values monitoring unit 401, a 2-dimensional coordinate values variation amount detection unit 402, a movement distance and movement direction acquisition unit 403, and a screen scroll control unit 404, as shown in FIG. 4.

The 2-dimensional coordinate values monitoring unit 401 compares the 2-dimensional coordinate values currently output from the sensor unit 104 with the 2-dimensional coordinate values previously output. If it is determined based on the result of the comparison that the movement of the portable device is stopped, the 2-dimensional coordinate values monitoring unit 401 provides the 2-dimensional coordinate values t1 of a position where the portable device began to move, and the 2-dimensional coordinate values t2 of a position where the portable device stopped movement, to the 2-dimensional coordinate values variation amount detection unit 402.

The 2-dimensional coordinate values variation amount detection unit 402 detects the x-axis variation amount d1 and the y-axis variation amount d2 as described above, by using the two 2-dimensional coordinate values t1 and t1', and provides the variation amounts to the movement distance and movement direction acquisition unit 403.

The movement distance and movement direction acquisition unit 403 obtains the movement distance and movement direction as described above, by using the input x-axis variation amount d1 and y-axis variation amount d2, and provides the movement distance and movement direction to the screen scroll control unit 404.

The screen scroll control unit 404 retrieves contents corresponding to the position based on the input movement distance and movement direction, among contents temporarily held in the control unit 103, and provides the retrieved contents to the display unit 102. Accordingly, the screen 311 as shown in FIG. 3B is displayed on the display unit 102.

Thus, in the case where the sensor unit 104 is composed of one 2-dimensional coordinate sensor, even when the portable device travels from the position 301 to position 303 as shown in FIG. 3A, if the 2-dimensional coordinates corresponding to the center of the moved portable device are t1', the screen displayed on the display unit 102 of the portable device, as shown in FIG. 3C, has the same contents as those of the screen 311 shown in FIG. 3B, even though the portable device is placed at position 303 different from position 302.

Figure 5:
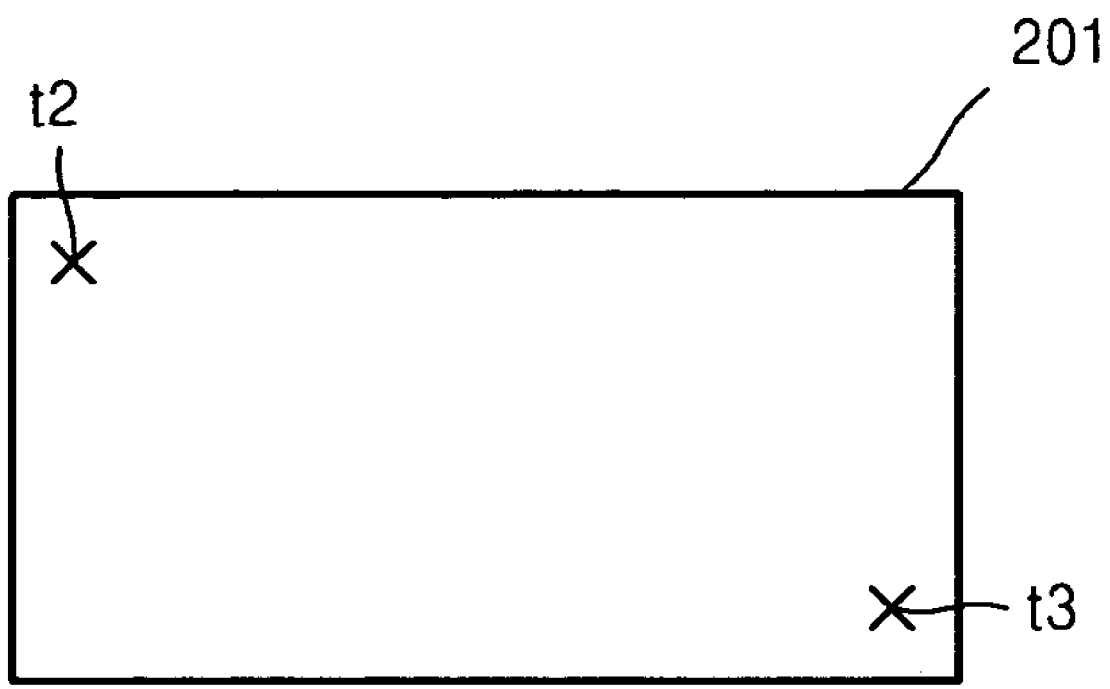
FIG. 5 illustrates positions of 2-dimensional coordinate values output from a sensor unit when the sensor unit includes two 2-dimensional coordinate sensors according to an exemplary embodiment of the present invention.

Meanwhile, if the sensor unit 104 includes a first 2-dimensional coordinate sensor and a second 2-dimensional coordinate sensor, the sensor unit 104 can output both 2-dimensional coordinate values (t2) corresponding to the left top corner of the portable device and 2-dimensional coordinate values (t3) corresponding to the right bottom corner of the portable device as shown, for example, in FIG. 5.

Figure 6A:
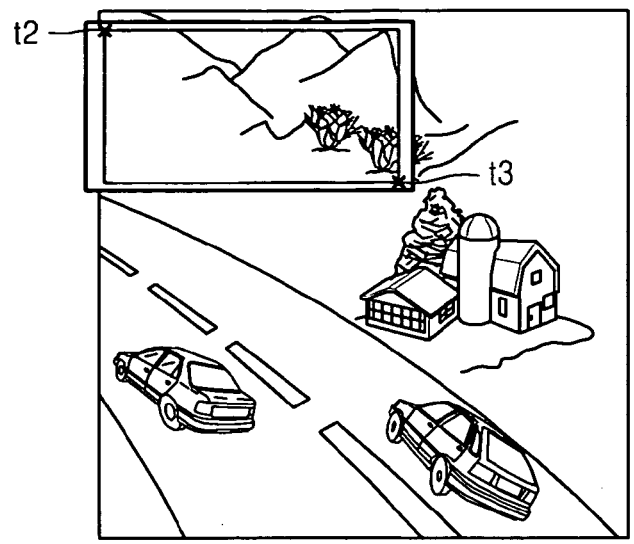
FIGS. 6A through 6C illustrate an example of the relation between 2-dimensional coordinate values output from a sensor unit composed of two 2-dimensional coordinate sensors, and the contents of a screen being displayed according to an exemplary embodiment of the present invention.
Figure 6B:
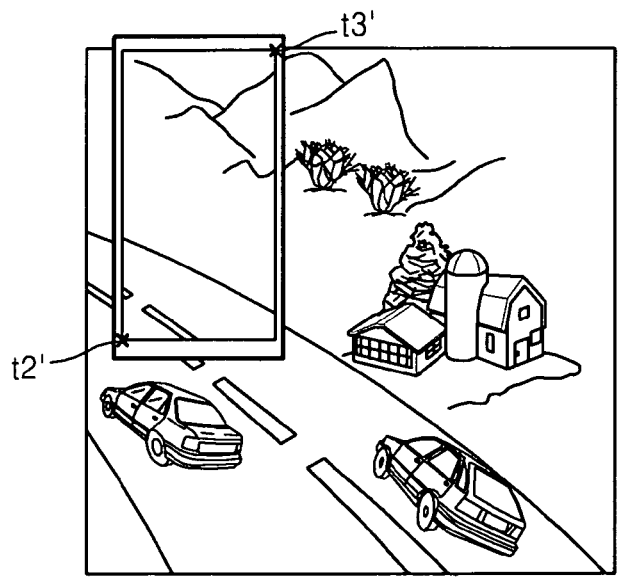
Figure 6C:
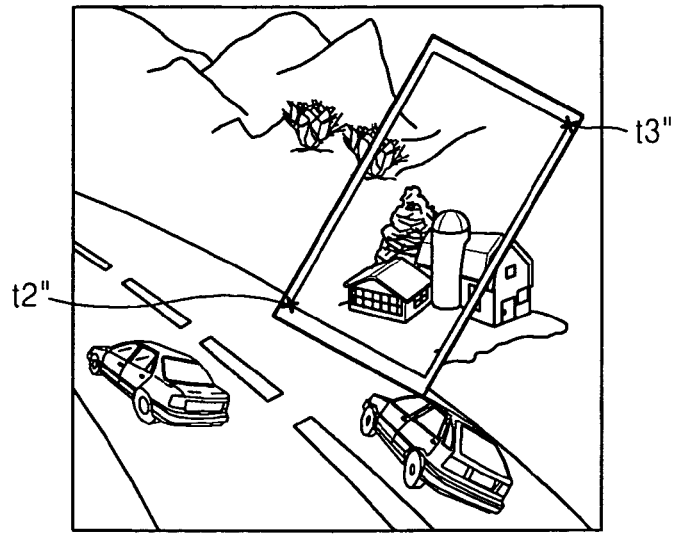

If the sensor unit 104 is attached at the center of the back of the portable device 201 as shown in FIG. 2A, and includes two 2-dimensional coordinate sensors as described above, the screen displayed on the display unit 102 can be scrolled with respect to the movement of the portable device as shown in FIGS. 6A through 6C.

That is, if as a result of monitoring the 2-dimensional coordinate values of the two positions (t2 and t3) output from the sensor unit 104, it is determined that 2-dimensional coordinate values of at least one of the two positions are changed, the control unit 103 scrolls the screen displayed on the display unit 102 based on the 2-dimensional coordinate values output from the sensor unit 104.

For example, if the 2-dimensional coordinate values t2 output from the first 2-dimensional coordinate sensor change to t2', and the 2-dimensional coordinate values t3 output from the second 2-dimensional coordinate sensor change to t3', as shown in FIGS. 6A and 6B, the control unit 103 detects the variation amount between t2 and t2' and the variation amount between t3 and t3'.

Based on the respective detected variation amounts, the control unit 103 obtains the movement direction and movement distance of the portable device, and based on the obtained movement direction and movement distance, scrolls the screen displayed on the display unit 102.

FIG. 6B shows a case where the portable device rotates 90 degrees, and FIG. 6C shows a case where the portable device is moved and tilted to the right. The screen is scrolled on the display unit 102 displaying the screen as if a user views a fixed scene through a small window seamlessly.

For this, the control unit 103 can be configured as shown in FIG. 4. At this time, the 2-dimensional coordinate values monitoring unit 401 monitors the 2-dimensional coordinate values of the two positions, and provides 2-dimensional coordinate values (t2, t2', t3, t3') of four positions in relation to the monitored 2-dimensional coordinate values of the two positions, to the 2-dimensional coordinate values variation amount detection unit 402.

The 2-dimensional coordinate values variation amount detection unit 402, the movement distance and movement direction acquisition unit 403 and the screen scroll control unit 404 operate corresponding to the 2-dimensional coordinate values (t2, t2', t3, t3') of four positions.

Figure 7:
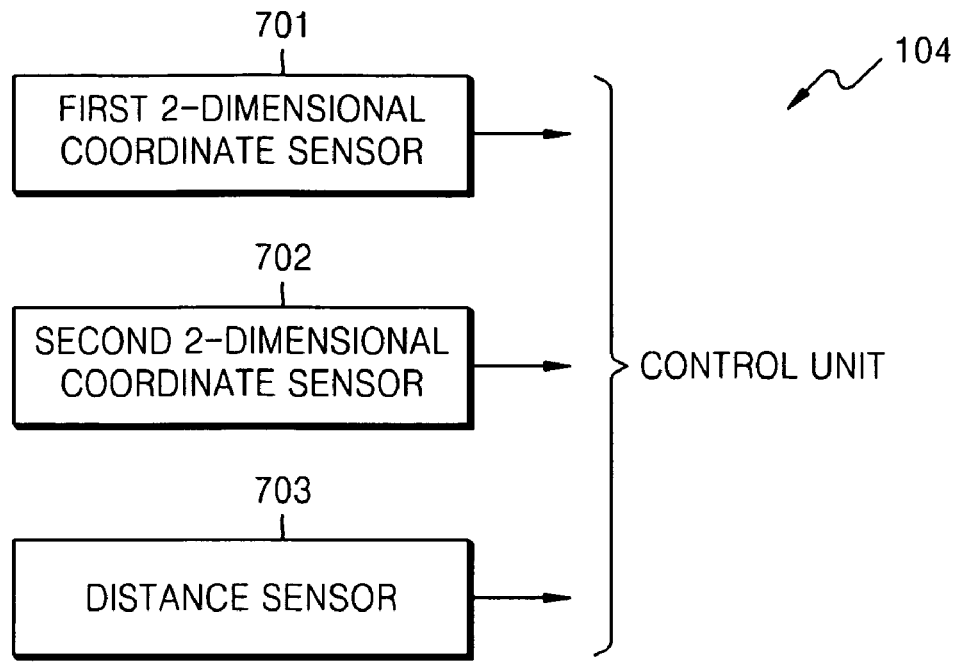
FIG. 7 is another block diagram of a sensor unit shown in FIG. 1.

Meanwhile, the sensor unit 104 of FIG. 1 may include a first 2-dimensional coordinate sensor 701, a second 2-dimensional coordinate sensor 702, and a distance sensor 703 as shown in FIG. 7. The first 2-dimensional coordinate sensor 701 and the second 2-dimensional coordinate sensor 702 sense and output the 2-dimensional coordinates of the positions as described above with reference to FIG. 5. The distance sensor 703 measures the distance between the sensor unit 104 and the ground, and outputs the measured distance value. The output distance value is provided to the control unit 103.

The control unit 103 controls the screen displayed on the display unit 102 based on the distance value received from the distance sensor 703, so that the screen can be zoomed in or out. When the screen is zoomed out, the control unit 103 displays a screen containing information indicating a screen region displayed on the display unit 102 before the zoom-out. For this, the control unit 103 has position information on the screen region displayed on the display unit 102 before the zoom-out, in the contents held by the control unit 103 and to be displayed on the display unit 102. The position information includes position information on a position at the top left corner and position information on a position at the bottom right corner.

Meanwhile, the sensor unit 104 may include one 2-dimensional coordinate sensor as described in FIG. 1, and the distance sensor of FIG. 7.

Figure 8:
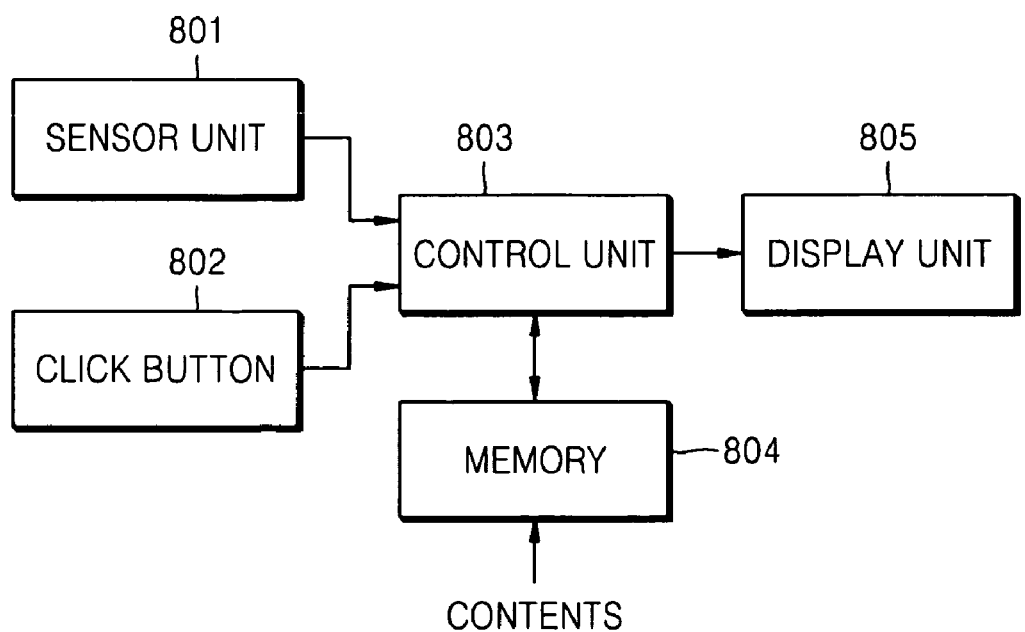
FIG. 8 is a functional block diagram of a screen scrolling apparatus of a portable device according to another exemplary embodiment of the present invention.

FIG. 8 is a functional block diagram of a screen scrolling apparatus of a portable device according to another exemplary embodiment of the present invention. Referring to FIG. 8, the screen scroll apparatus of a portable device includes a sensor unit 801, a click button 802, a control unit 803, a memory 804, and a display unit 805.

The sensor unit 801 may be composed, for example, of one 2-dimensional coordinate sensor, or two 2-dimensional coordinate sensors, or one 2-dimensional coordinate sensor and a distance sensor, or two 2-dimensional coordinate sensors and a distance sensor. The memory 804 is similar to the memory 101 of FIG. 1.

Figure 9:
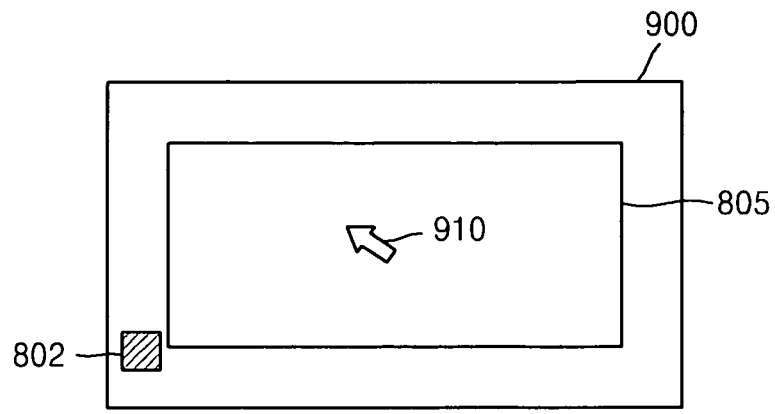
FIG. 9 illustrates relations among a portable device, a click button, and a pointer according to an exemplary embodiment of the present invention.

The click button 802 may be mounted on the front surface of the portable device 900 as shown in FIG. 9. FIG. 9 illustrates relations among a portable device, a click button, and a pointer according to an embodiment of the present invention.

In the display unit 805, a pointer 910 is set at the center of the display unit 805 as shown in FIG. 9. The pointer 910 is set in advance.

While a screen displayed on the display unit 805 is scrolled based on 2-dimensional coordinate values output from the sensor unit 801, if the click button 802 is pressed, the control unit 803 recognizes that a region corresponding to the pointer 910 set in advance in the screen displayed on the display unit 805 is selected by a user, and processes the selection of the region corresponding to the pointer 910.

The pointer 910 may be set in advance at a place other than the center of the display unit 805 as shown in FIG. 9. The position of the pointer 910 can be recognized by the user through the display unit 805. Accordingly, while the user monitors the scrolling of the screen displayed on the display unit 805, if the pointer 910 is positioned at a region desired to be selected, the user can manipulate the click button 802 so that the control unit 803 can process the selection of the region.

Accordingly, for example, a sub-image, a sub-document, or a sub-web page linked to the selected region may be displayed on the display unit 805. At this time, if the resolution of the sub-image, sub-document, or sub-web page is higher than that of the screen that can be displayed on the display unit 805, the control unit 803 can scroll the screen displayed on the display unit 805, by monitoring 2-dimensional coordinate values output from the sensor unit 801. The sub-image, sub-document, or sub-web page is stored in the memory 804. The sub-image, sub-document, or sub-web page can be stored in the memory 804 in the same manner that the contents are obtained.

Figure 10:
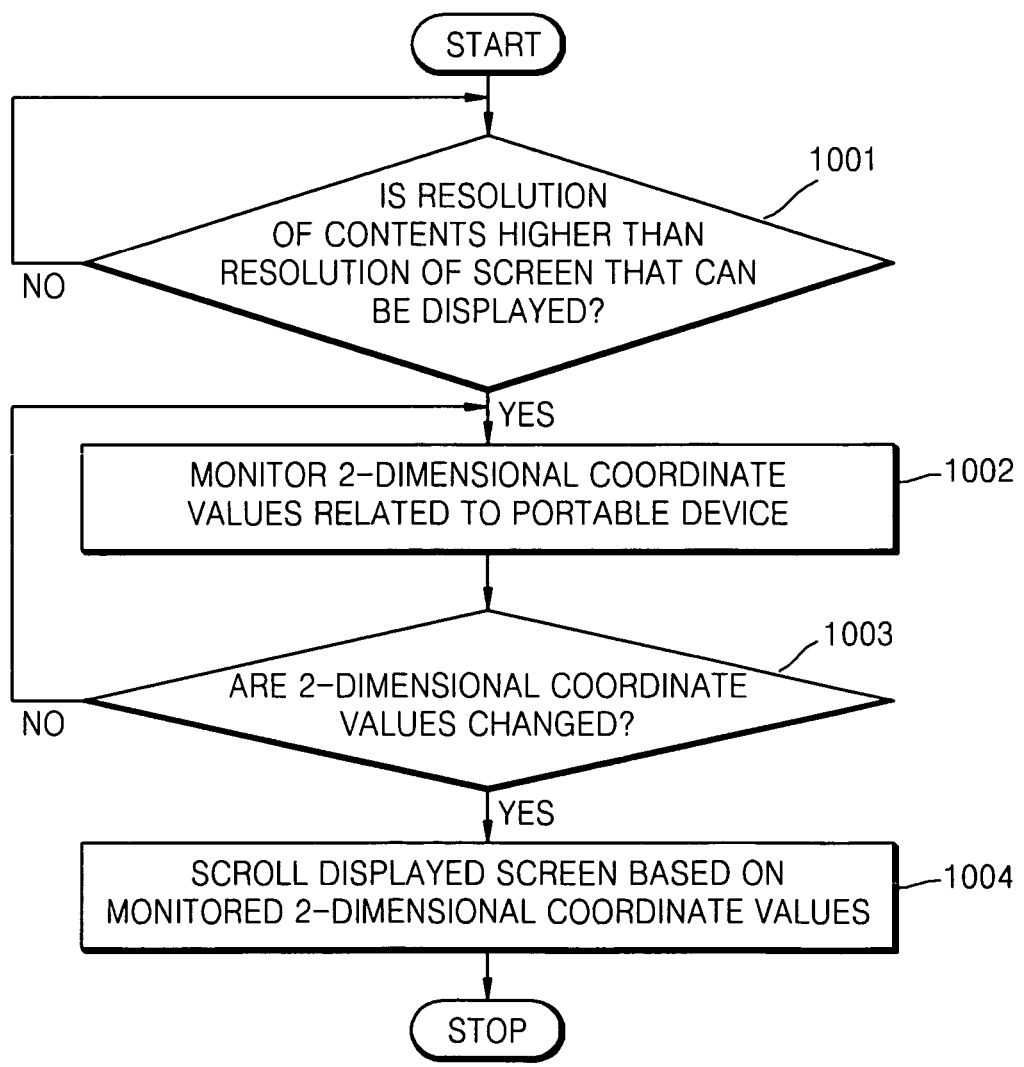
FIG. 10 is a flowchart of a screen scrolling method of a portable device according to another exemplary embodiment of the present invention.

FIG. 10 is a flowchart of a screen scrolling method of a portable device according to another exemplary embodiment of the present invention. Referring to FIG. 1, the flowchart of FIG. 10 will now be explained.

First, if the resolution of contents displayed on the display unit 102 is higher than that of the screen that can be displayed on the display unit 102, the control unit 103 monitors 2-dimensional coordinate values related to the portable device output from the sensor unit 104 in operations 1001 and 1002.

The 2-dimensional coordinate values related to the portable device may include 2-dimensional coordinate values corresponding to the center of the portable device, or 2-dimensional coordinate values corresponding to the top left corner of the portable device and 2-dimensional coordinate values corresponding to the bottom right corner of the portable device. If the sensor unit 104 is attached to the portable device, the 2-dimensional coordinate values may vary with respect to the movement of the portable device. If the sensor unit 104 is separated from the portable device, the 2-dimensional coordinate values may vary with respect to the movement of the sensor unit 104.

If it is determined according to the monitoring result that the 2-dimensional coordinate values are changed, the control unit 103 scrolls the screen displayed on the display unit 102 based on the monitored 2-dimensional coordinate values in operations 1003 and 1004.

If it is determined in operation 1003 that the 2-dimensional coordinate values are not changed, the control unit 103 returns to operation 1002 and monitors 2-dimensional coordinate values.

Figure 11:
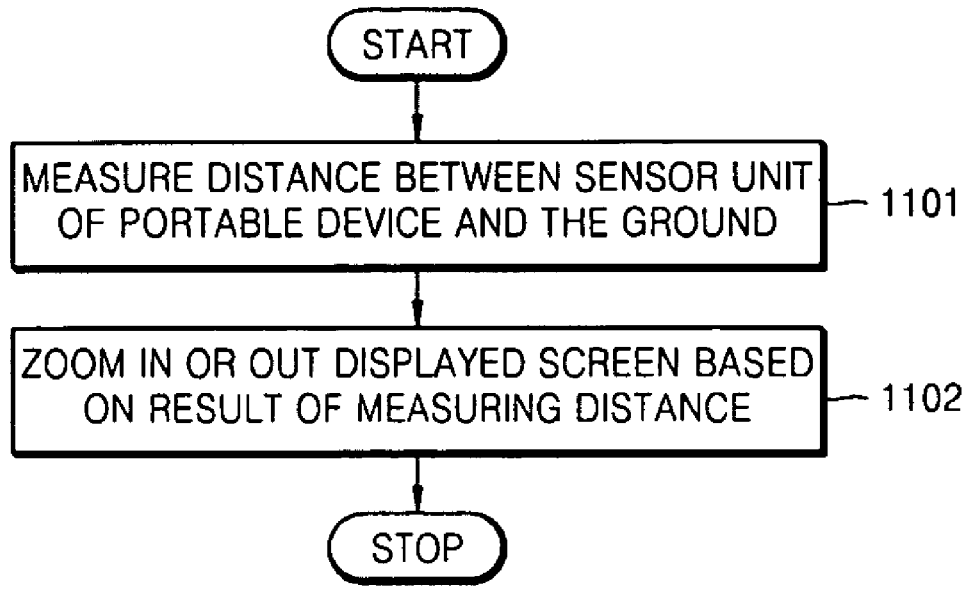
FIG. 11 is a flowchart of a zoom-in or zoom-out operation in a screen scroll method of a portable device according to another exemplary embodiment of the present invention.

FIG. 11 is a flowchart of a zoom-in or zoom-out operation in a screen scroll method of a portable device according to another exemplary embodiment of the present invention. Referring to FIG. 1, the flowchart of FIG. 11 will now be explained.

The distance between the sensor unit 104 attached to or separated from the portable device and the ground is measured in operation 1101. The displayed screen is zoomed in or out based on the result of the measuring the distance in operation 1102. That is, if the result of the measuring indicates that the sensor unit 104 becomes more distant from the ground, the control unit 103 controls the screen displayed on the display unit 102 so that the screen is zoomed out. Conversely, if the result of the measuring indicates that the sensor unit 104 becomes closer to the ground, the control unit 103 controls the screen displayed on the display unit 102 so that the screen is zoomed in.

Figure 13A:
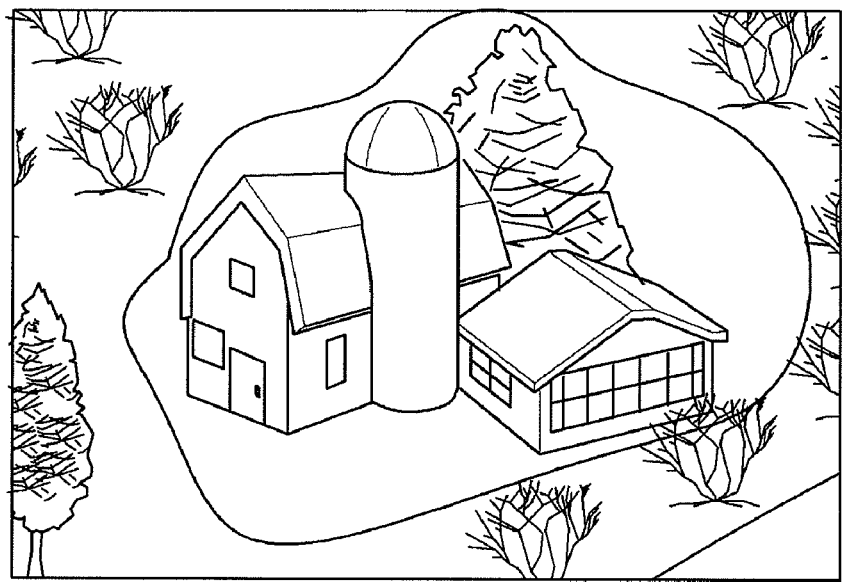
FIG. 13A is an example of a screen displayed before zoom-out of the screen according to an exemplary embodiment.
Figure 13B:
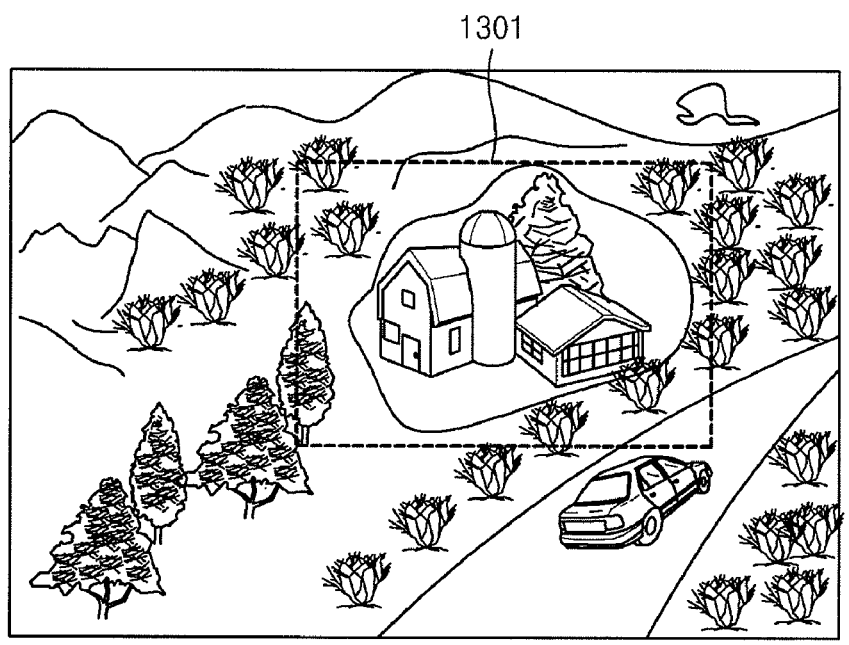
FIG. 13B is an example of a screen displayed after zoom-out of the screen according to an exemplary embodiment.

When the screen is zoomed out in operation 1102, an operation to mark the screen region displayed on the portable device before the zooming out may be included. FIG. 13A illustrates an example of a screen displayed on the display unit 102 before zooming out, and FIG. 13B is an example of a screen displayed on the display unit 102 after zooming out of the screen. Accordingly, the screen displayed on the display unit 102 for the zooming out may also be a screen as shown, for example, in FIG. 3B, FIG. 6B, or FIG. 6C. The operations of FIG. 11 may be performed, for example, before or after operation 1002 of FIG. 10, or after operation 1004.

Figure 12:
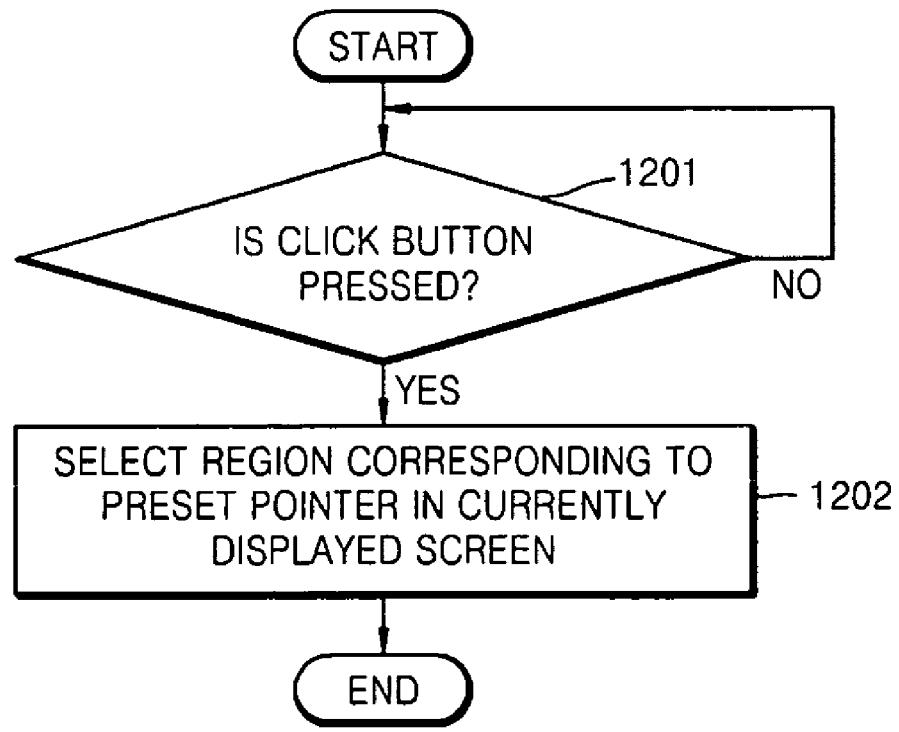
FIG. 12 is an operation flowchart of a click function in a screen scroll method of a portable device according to another exemplary embodiment of the present invention.

FIG. 12 is an operation flowchart of a click function in a screen scroll method of a portable device according to another exemplary embodiment of the present invention. Referring to FIG. 8, the flowchart of FIG. 12 will now be explained.

If the click button 802 is pressed, the control unit 103 selects a region corresponding to the pointer 910 set in advance on the currently displayed screen in operation 1202. The operations of FIG. 12 may be performed, for example, before or after operation 1002 of FIG. 10, or after operation 1004.

The present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

According to the present invention as described above, when a screen of a resolution higher than that of a screen of a portable device is displayed, the screen can be scrolled quickly and easily as if the screen is seen seamlessly through a small window. That is, dynamic scrolling of the screen is enabled.

Because of this quick and easy screen scrolling, a desired image region can be clicked easily.

Also, according to the present invention, when a screen with a resolution higher than that of the screen of the portable device is displayed, the position of a region displayed on the screen of the portable device in the entire screen can be recognized using a zoom-out operation such that screen can be scrolled more quickly and effectively.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A screen scroll apparatus of a portable device, the apparatus comprising:
    a sensor unit which senses and outputs 2-dimensional coordinate values of a plurality of positions located on different portions of the portable device;
    a display unit which displays a screen;
    a memory storing contents with a resolution higher than that of the screen that can be displayed on the display unit; and
    a control unit which scrolls the screen displayed on the display unit based on the 2-dimensional coordinate values if the 2-dimensional coordinate values of at least one of the plurality of positions change when contents are read from the memory and provided to the display unit.

2. The apparatus of claim 1, wherein the 2-dimensional coordinate values of the plurality of positions comprise 2-dimensional coordinate values corresponding to a center of the portable device.

3. The apparatus of claim 1, wherein the sensor unit comprises:
    a first 2-dimensional coordinate sensor which senses and outputs 2-dimensional coordinate values corresponding to a top left corner of the portable device; and
    a second 2-dimensional coordinate sensor which senses and outputs 2-dimensional coordinate values corresponding to a bottom right corner of the portable device.

4. The apparatus of claim 3, wherein the sensor unit further comprises a distance sensor measuring a distance between the sensor unit and the ground and providing a value of the measured distance to the control unit, and
    wherein the control unit controls operations of the memory and the display unit based on the value of the measured distance provided by the distance sensor so that the screen displayed on the display unit is zoomed in or out.

5. The apparatus of claim 4, wherein when the screen is zoomed out, the control unit displays a screen including information marking a screen region displayed on the display unit before the zooming out occurs.

6. The apparatus of claim 4, further comprising a click button on the portable device, wherein if the click button is pressed, the control unit recognizes that a region corresponding to a pointer set in advance on the display unit is selected.

7. The apparatus of claim 3, wherein the sensor unit is detachable from the portable device, and if the sensor unit is attached to the portable device, the 2-dimensional coordinate values vary with respect to movement of the portable device, and if the sensor unit is separated from the portable device, the 2-dimensional coordinate values vary with respect to movement of the sensor unit.

8. The apparatus of claim 2, wherein the sensor unit further comprises a distance sensor which measures a distance between the sensor unit and the ground, and which provides a value of the measured distance to the control unit, and
wherein the control unit controls operations of the memory and the display unit based on the value of the measured distance provided by the distance sensor so that the screen displayed on the display unit is zoomed in or out.

9. The apparatus of claim 2, wherein the sensor unit is detachable from the portable device, and if the sensor unit is attached to the portable device, the 2-dimensional coordinate values vary with respect to movement of the portable device, and if the sensor unit is separated from the portable device, the 2-dimensional coordinate values vary with respect to movement of the sensor unit.

10. The apparatus of claim 1, wherein the sensor unit is detachable from the portable device, and if the sensor unit is attached to the portable device, the 2-dimensional coordinate values vary with respect to movement of the portable device, and if the sensor unit is separated from the portable device, the 2-dimensional coordinate values vary with respect to movement of the sensor unit.

11. A screen scroll method of a portable device with a detachable sensor unit, the method comprising:
monitoring 2-dimensional coordinate values of a plurality of positions located on different portions of the portable device output from the sensor unit when a resolution of contents displayed on the portable device is higher than a resolution of a screen that can be displayed on the portable device; and
scrolling a screen displayed on the portable device based on the 2-dimensional coordinate values when the 2-dimensional coordinate values of at least one of the plurality of positions change.

12. The method of claim 11, wherein the 2-dimensional coordinate values of the plurality of positions comprise 2-dimensional coordinate values corresponding to a center of the portable device.

13. The method of claim 11, wherein the 2-dimensional coordinate values of the plurality of positions comprise 2-dimensional coordinate values corresponding to a top left corner of the portable device and 2-dimensional coordinate values corresponding to a bottom right corner of the portable device.

14. The method of claim 13, further comprising:
measuring a distance between the sensor unit and the ground; and
zooming in or out the screen displayed on the portable device based on a value of the measured distance.

15. The method of claim 14, wherein in the zooming in or out, when the screen is zoomed out, marking a screen region displayed on the display unit before the zooming out occurs.

16. The method of claim 14, further comprising selecting a region corresponding to a pointer set in advance on a currently displayed screen if a click button on the portable device is pressed.

17. The method of claim 11, wherein if the sensor unit is attached to the portable device, the 2-dimensional coordinate values vary with respect to movement of the portable device, and if the sensor unit is separated from the portable device, the 2-dimensional coordinate values vary with respect to movement of the sensor unit.

18. The method of claim 12, further comprising:
measuring a distance between the sensor unit and the ground; and
zooming in or out the screen displayed on the portable device based on a value of the measured distance.

19. A non-transitory computer-readable medium having thereon computer-readable instructions for enabling a computer to perform a screen scroll method of a portable device with a detachable sensor unit, the method comprising:
obtaining 2-dimensional coordinate values of a plurality of positions located on different portions of the portable device from the sensor unit; and
scrolling a screen displayed on the portable device based on the 2-dimensional coordinate values when the 2-dimensional coordinate values of at least one of the plurality of positions change.

* * * * *